(12) United States Patent
LaCourse et al.

(10) Patent No.: US 9,175,216 B2
(45) Date of Patent: Nov. 3, 2015

(54) CERAMIC SCINTILLATOR BODY AND SCINTILLATION DEVICE

(75) Inventors: Brian C. LaCourse, Pepperell, MA (US); Anne B. Hardy, Paris (FR); Hélène Laetitia Rétot, Avignon (FR); Qiwei Chen, Shanghai (CN); Xiaofeng Peng, Shanghai (CN); Bruno Viana, Montgeron (FR); Morteza Zandi, Webster, MA (US)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 1161 days.

(21) Appl. No.: 13/142,763

(22) PCT Filed: Dec. 24, 2009

(86) PCT No.: PCT/US2009/069539
§ 371 (c)(1),
(2), (4) Date: Sep. 23, 2011

(87) PCT Pub. No.: WO2010/078224
PCT Pub. Date: Jul. 8, 2010

(65) Prior Publication Data
US 2012/0085972 A1   Apr. 12, 2012

Related U.S. Application Data

(60) Provisional application No. 61/141,570, filed on Dec. 30, 2008.

(51) Int. Cl.
*C09K 11/77* (2006.01)
*C04B 35/645* (2006.01)
(Continued)

(52) U.S. Cl.
CPC ............. *C09K 11/7769* (2013.01); *B82Y 30/00* (2013.01); *C01F 17/0018* (2013.01);
(Continued)

(58) Field of Classification Search
CPC ............. C09K 11/7759; C09K 11/776; C09K 11/7767; C09K 11/7766; C09K 11/7715; C09K 11/7716; C09K 11/7728; C09K 11/7729; C09K 11/7743; C09K 11/7744; C09K 11/7756; C09K 11/7757; C09K 11/7783; C09K 11/7784; C09K 11/7787; C09K 11/7769
USPC .................................................. 252/301.4 R
See application file for complete search history.

(56) References Cited

U.S. PATENT DOCUMENTS

| 4,421,671 A | 12/1983 | Cusano et al. |
| 4,466,929 A | 8/1984 | Greskovich et al. |

(Continued)

FOREIGN PATENT DOCUMENTS

| CN | 1587187 A | 3/2005 |
| CN | 1818017 A | 8/2006 |

(Continued)

OTHER PUBLICATIONS

Zhou. Sol—Gel Synthesis and Photoluminescence of RExLu2—xO3:Eu3+ (RE=Y, Gd) Nanophosphors. Inorganic Materials, vol. 41, No. 6, 2005, pp. 613-617.*

(Continued)

*Primary Examiner* — Matthew E Hoban
(74) *Attorney, Agent, or Firm* — Abel Law Group, LLP; Robert N Young

(57) ABSTRACT

A ceramic scintillator body includes a polycrystalline ceramic scintillating material having a substantially cubic crystallographic structure. The polycrystalline ceramic scintillating material has a chemical composition represented by a general formula $LU_{(2-x)}Gd_xO_3:Ac$, where x is greater than zero and less than two, and where Ac is an activator.

20 Claims, 4 Drawing Sheets

(51) Int. Cl.
  *C04B 35/50* (2006.01)
  *C01F 17/00* (2006.01)
  *B82Y 30/00* (2011.01)

(52) U.S. Cl.
  CPC ............ *C01F 17/0043* (2013.01); *C04B 35/50* (2013.01); *C04B 35/6455* (2013.01); *C01P 2002/52* (2013.01); *C01P 2002/84* (2013.01); *C01P 2004/32* (2013.01); *C01P 2004/62* (2013.01); *C01P 2004/64* (2013.01); *C01P 2006/60* (2013.01); *C04B 2235/3224* (2013.01); *C04B 2235/443* (2013.01); *C04B 2235/72* (2013.01); *C04B 2235/762* (2013.01); *C04B 2235/781* (2013.01); *C04B 2235/785* (2013.01); *C04B 2235/786* (2013.01); *C04B 2235/9653* (2013.01)

(56) References Cited

U.S. PATENT DOCUMENTS

| | | |
|---|---|---|
| 4,473,513 A | 9/1984 | Cusano et al. |
| 4,518,545 A | 5/1985 | Cusano et al. |
| 4,518,546 A | 5/1985 | Greskovich et al. |
| 4,525,628 A | 6/1985 | DiBianca et al. |
| 4,571,312 A | 2/1986 | Greskovich et al. |
| 4,747,973 A | 5/1988 | Cusano et al. |
| 4,980,560 A | 12/1990 | Bryan et al. |
| 5,116,559 A | 5/1992 | Dole et al. |
| 5,116,560 A | 5/1992 | Dole et al. |
| 5,213,712 A | 5/1993 | Dole |
| 5,296,163 A | 3/1994 | Leppert et al. |
| 5,318,722 A | 6/1994 | Tsoukala et al. |
| 5,484,750 A | 1/1996 | Greskovich et al. |
| 5,521,387 A | 5/1996 | Riedner et al. |
| 5,562,860 A | 10/1996 | Grabmaier et al. |
| 5,640,016 A | 6/1997 | Matsuda et al. |
| 5,676,891 A | 10/1997 | Boedinger |
| 5,882,547 A | 3/1999 | Lynch et al. |
| 6,093,347 A | 7/2000 | Lynch et al. |
| 6,197,719 B1 | 3/2001 | Choudhary et al. |
| 6,323,489 B1 | 11/2001 | McClellan |
| 6,340,436 B1 | 1/2002 | Yamada et al. |
| 6,384,417 B1 | 5/2002 | Okumura et al. |
| 6,504,156 B1 | 1/2003 | Takahara et al. |
| 6,822,240 B2 | 11/2004 | Francke et al. |
| 6,967,330 B1 | 11/2005 | Lempicki et al. |
| 7,329,370 B2 | 2/2008 | Kim et al. |
| 7,531,109 B2 | 5/2009 | LaCourse et al. |
| 8,034,258 B2 | 10/2011 | Ferrand et al. |
| 2001/0028700 A1 | 10/2001 | Duclos et al. |
| 2002/0013215 A1 | 1/2002 | Nakamura |
| 2003/0159643 A1 | 8/2003 | Sumiya et al. |
| 2003/0183806 A1 | 10/2003 | Lyons |
| 2003/0193040 A1 | 10/2003 | Venkataramani et al. |
| 2005/0087724 A1 | 4/2005 | Kim et al. |
| 2007/0131908 A1 | 6/2007 | Krishna et al. |
| 2007/0292330 A1 | 12/2007 | Kurata et al. |
| 2008/0025895 A1 | 1/2008 | Hosokawa et al. |
| 2008/0128623 A1 | 6/2008 | Srivastava |
| 2009/0189121 A1 | 7/2009 | LaCourse et al. |
| 2012/0001074 A1 | 1/2012 | Hardy et al. |
| 2012/0012787 A1 | 1/2012 | LaCourse et al. |
| 2012/0049118 A1 | 3/2012 | LaCourse et al. |

FOREIGN PATENT DOCUMENTS

| | | |
|---|---|---|
| CN | 1982259 A | 6/2007 |
| CN | 101001936 A | 7/2007 |
| CN | 101265098 * | 9/2008 |
| CN | 101265098 A | 9/2008 |
| CN | 101270283 * | 9/2008 |
| CN | 101270283 A | 9/2008 |
| CN | 20081011236 A | 9/2008 |
| EP | 0166566 A2 | 1/1986 |
| EP | 0097300 B1 | 6/1988 |
| EP | 0297269 A1 | 1/1989 |
| EP | 0419847 A1 | 4/1991 |
| EP | 1028154 A1 | 8/2000 |
| JP | 59030883 A | 2/1984 |
| JP | 6438491 A | 2/1989 |
| JP | 1242456 A | 9/1989 |
| JP | 2073902 A | 3/1990 |
| JP | 2213403 A | 8/1990 |
| JP | 11029767 A | 2/1999 |
| JP | 11315278 A | 11/1999 |
| JP | 2002275465 A | 9/2002 |
| WO | 2005028591 A1 | 3/2005 |
| WO | 2005110943 A1 | 11/2005 |

OTHER PUBLICATIONS

Jiang Danyu, "The Brief Introduction of the Application of Hafnium Compounds in Fine Ceramics," Shanghai Institute of Ceramics, Chinese Academy of Science, Shanghai 200050, China, Rare Metals Letters, vol. 26 (1), 2007-01, 10 pages (includes partial English translation received from Lee and Li—Attorney's-at-Law).

R. Babu et al., "Calorimetric measurements on rare earth pyrohafnates RE2Hf2O7 (RE=La,Eu,Gd)," Elsevier, Journal of Alloys and Compounds, 265 (1998), pp. 137-139.

The International Search Report and the Written Opinion for International Application No. PCT/US2009/069532 received from the International Searching Authority (ISA/KR), dated Aug. 17, 2010, 10 pages.

The International Search Report and the Written Opinion for International Application No. PCT/US2009/069533 received from the International Searching Authority (ISA/KR), dated Aug. 13, 2010, 10 pages.

The International Search Report and the Written Opinion for International Application No. PCT/US2009/069538 received from the International Searching Authority (ISA/KR), dated Jul. 30, 2010, 10 pages.

The International Search Report and the Written Opinion for International Application No. PCT/US2009/069539 received from the International Searching Authority (ISA/KR), dated Jul. 16, 2010, 8 pages.

C. Greskovich et al., "Ceramic Scintillators," Annual Reviews Inc., General Electric Corporate Research and Development, Ceramics Laboratory, Niskayuna, New York, Annu. Rev. Mater. Sci. 27, 1997, pp. 69-88.

David J. Krus et al., "Preision linear and two-dimensional scintillation crystal arrays for x-ray and gamma ray imaging applications," Bicron, a division of Saint-Gobain Industrial Ceramics, Inc., Presented at the SPIE International Synosium on Optical Science, Engineering and Instrumentation, dated Jul. 18-23, 1999, Hard X-Ray, Gamma-Ray and Neuton Detector Physics (SPIE vol. 3768), 12 pages.

C. De Mello Donega et al., "Non-Radiative Relaxation Processes of the Pr3+ Ion in Solids," Pergamon, J. Phys. Chem. Solids vol. 56, No. 5, Elesvier Science Ltd., pp. 673-685.

Frank Schrey, "Effect of pH on the Chemical Preparation of Barium-Strontium Titanate," Journal of the American Ceramic Society, vol. 48, No. 8, Bell Telephone Laboratories, Inc., Murray-Hill, New Jersey, dated Aug. 1965, 5 pages.

G.Z. Li et al., "Sol-Gel Fabrication and Photoluminescence Properties of SiO2 @ Gd2O3:Eu3+ Core-Shell Particles," Journal of Nanoscience and Nanotechnology: A Special Issue on SWCNT Growth Mechanisms, vol. 6, No. 5, <www.aspbs.com/jmn>, American Scientific Publishers, dated May 2006, 8 pages.

H. Morkoc et al., "Large-band-gap SiC, III-V nitride, and II-VI ZnSe-based semiconductor device technologies," American Institute of Physics, J. App. Phys. 73 (3), dated Aug. 1, 1994, downloaded Jan. 27, 2005, 36 pages.

E.A. Ivanova et al., "Synthesis of Low-Agglomerated Nanoprecursors in the ZrO2—HfO2—Y2—O3 System," Advanced Study Center Co. Ltd., Rev.Adv.Mater.Sci. 10 (2005), pp. 357-361.

(56) References Cited

OTHER PUBLICATIONS

Y.M. Ji et al., "Structure and luminescence of HfO2-codoped Gd2O3:Eu phosphors," Shanghai Institute of Ceramics, Chinese Academy of Sciences,Shanghai, PR China, Elsevier, Journal of Luminescence, 122-123 (2007), Available online Mar. 20, 2006, pp. 984-986.

Paul Lecoq et al., "New Inorganic Scintillation Materials Development for Medical Imaging," IEEE Transactions on Nuclear Science, vol. 49, No. 4, dated Aug. 2002, 4 pages.

L.H. Brixner, "Structural and Luminescent Properties of the Ln2Hf2O7-Type Rare Earth Hafnates," Mat. Res. Bull., vol. 19, No. 2, dated 1984, pp. 143-149.

V.V. Nagarkar et al., "Structured Lil Scintillator for Thermal Neutron Imaging," IEEE Transactions on Nuclear Science, vol. 48, No. 6, dated Dec. 2001, 5 pages.

V. Pelova et al., "Luminescence of Y2O3: Eu and Gd2O3: Eu Depending on Precursor and Activation Temperature," Crystal Research Technology, 33, dated 1998, 1, pp. 125-128.

Richard A. Swalin, "Thermodynamics of Solids," University of Minnesota, John Wiley & Sons, Inc., dated 1972, 5 pages.

Arhtur L. Robinson, "A Chemical Route to Advanced Ceramics," American Association for the Advancement of Science, <http://www.jstor.org/stable/1697490>, Science, New Series, vol. 233, No. 4759 (Jul. 4, 1986), Accessed Sep. 30, 2011, 4 pages.

Christopher R. Stanek et al., "Prediction of Rare-earth A2Hf2O7 Pyrochlore Phases," Communications of the American Ceramic Society, vol. 85, No. 8, Manuscript No. 187131, Presented at the 104th Annual meeting of the American Ceramic Society, dated Aug. 2002, 3 pages.

N. Teneze et al., "Cation-deficient perovskite-related compounds (Ba,La)nTin-1O3n (n=4, 5, and 6): a Rietveld refinement from neutron powder diffraction data," Pergamon, Materials Research Bulletin, 35, dated 2000, 12 pages.

Shunkichi Ueno et al., "High Temperature Water Vapor Corrosion Behavior of Titanium Aluminate (al2TiO5)," Synergy Materials Research Center, National Institute of Advanced Industrial Science and Technology, Journal of the Ceramic Society of Japan, 111 [11], dated 2003, pp. 860-862.

Yaming Ji et al., "La2Hf2O7:Ti4+ ceramic scintillator for x-ray imaging," Shanghai Institute of Ceramics, Chinese Academy of Sciences, Materials Research Society, J. Mater. Res., vol. 20, No. 3, dated Mar. 2005, 4 pages.

Ya-Ming Ji et al., "Preparation and spectroscopic properties of La2Hf2O7:Tb," Science Direct, R&D Center of Shanghai Institute of Ceramics, Chinese Academy of Sciences, Shanghai 200050, PR of China, Elsevier, Materials Lettersvol. 59, dated 2005, pp. 868-871.

Yaming Ji et al., "Fabrication of transparent La2Hf2O7 ceramics from combustion synthesized powders," R&D Center of Shanghai Institute of Ceramics, Chinese Academy of Sciences, Shanhai 200050, PR China, Elsevier, Sicence Direct, Materials Research Bulletin, vol. 40, dated 2005, pp. 553-559.

Lubomir Havlak, "Preparation and luminescence of Lu4Hf3O12 powder samples doped by trivalent Eu, Tb, Ce, Pr, Bi ions," Institute of Physics AS CR, Na Slovance 2, CZ-18221 Praue 8, Czech Republic, Elsevier, Optical Materials, vol. 32, dated 2010, pp. 1372-1374.

Zeli Soares Macedo et al., "Laser-Sintered Bismuth Germanate Ceramics as Scintillator Devices," Journal of the American Ceramic Society, vol. 87, No. 6, dated Jun. 2004, pp. 1076-1081.

M. Nikl, "Wide Band Gap Scintillation Materials: Progress in the Technology and Material Understanding," Institute of Physics, Academy of Sciences of the Czech Republic, Cukrovarnicka 10, CZ-162 53, Prague, Czech Republic, phys. stat. sol. (a) 178, 595, dated 2000, 26 pages.

\* cited by examiner

CERAMIC SCINTILLATOR BODY AND SCINTILLATION DEVICE

CROSS-REFERENCE TO RELATED APPLICATIONS

The present application claims priority to PCT Application No. PCT/US 09/69539, filed Dec. 24, 2009, entitled "CERAMIC SCINTILLATOR BODY AND SCINTILLATION DEVICE," by Brian C. LaCourse et al., which in turn claims priority to U.S. Provisional Application Number 61/141,570 filed Dec. 30, 2008, entitled "CERAMIC SCINTILLATOR BODY AND SCINTILLATION DEVICE," by Brian C. LaCourse et al., all of which are all incorporated by reference herein in their entireties.

FIELD OF THE DISCLOSURE

The present disclosure is directed to scintillator devices, particularly ruggedized scintillator devices for industrial applications, and to ceramic scintillator bodies.

BACKGROUND

Scintillation devices are used in a variety of industrial applications. For example, scintillation devices are used for well logging in the oil and gas industry and for imaging scans in the medical field. Typically, scintillation devices include scintillator bodies, such as a scintillator crystal, produced from a material that is effective to detect gamma rays, x-rays, ultraviolet radiation or other radiation. The scintillator bodies can absorb x-rays or other radiation and emit light. The emitted light can sometimes be recorded on film. Generally, the scintillator bodies are enclosed in casings or sleeves that include a window to permit radiation-induced scintillation light to pass out of the crystal package. The light passes to a light-sensing device such as a photomultiplier tube, a photodiode, or another photosensor that converts the light emitted from the scintillator body into electrical pulses. In other applications, multiple scintillator bodies can be used in imaging arrays for medical imaging equipment.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF THE DRAWINGS

Numerous innovative teachings of the present application will be described with particular reference to exemplary embodiments. However, it should be understood that this class of embodiments provides only a few examples of the many advantageous uses of the innovative teachings herein. In general, statements made in the specification of the present application do not necessarily limit any of the various claimed articles, systems, or methods. Moreover, some statements may apply to some inventive features but not to others.

The demands of well logging and medical imaging benefit from scintillation devices that are accurate under harsh and fast conditions. Various classes of scintillating materials can be used to produce scintillator bodies depending on intended applications. For example, single crystal oxyorthosilicates, such as lutetium yttrium oxyorthosilicate (LYSO), are often used in medical imaging applications, such as positron emission tomography (PET). These materials are typically characterized by relatively high stopping power and fast decay times. Nonetheless, LYSO is often characterized by low light output, and performance in PET scan applications can suffer from electron emission resulting from the $\beta^-$ decay of lutetium.

Another class of scintillating materials includes ceramic rare earth sulfoxylates, such as gadolinium oxysulfide (GOS). Ceramic materials such as GOS can be less costly than single crystal materials, such as LYSO. However, the hexagonal structure of ceramic rare earth sulfoxylates often causes "birefringence," or light scattering at grain boundaries. As a result, such materials are less transparent and exhibit less light output or brightness than many single crystal materials. Consequently, improvements in scintillator efficiency and brightness that might be caused by the compatibility of ceramic rare earth sulfoxylates with certain activators are typically diminished by the reduced transparency that results from their hexagonal structures.

Figure 1:
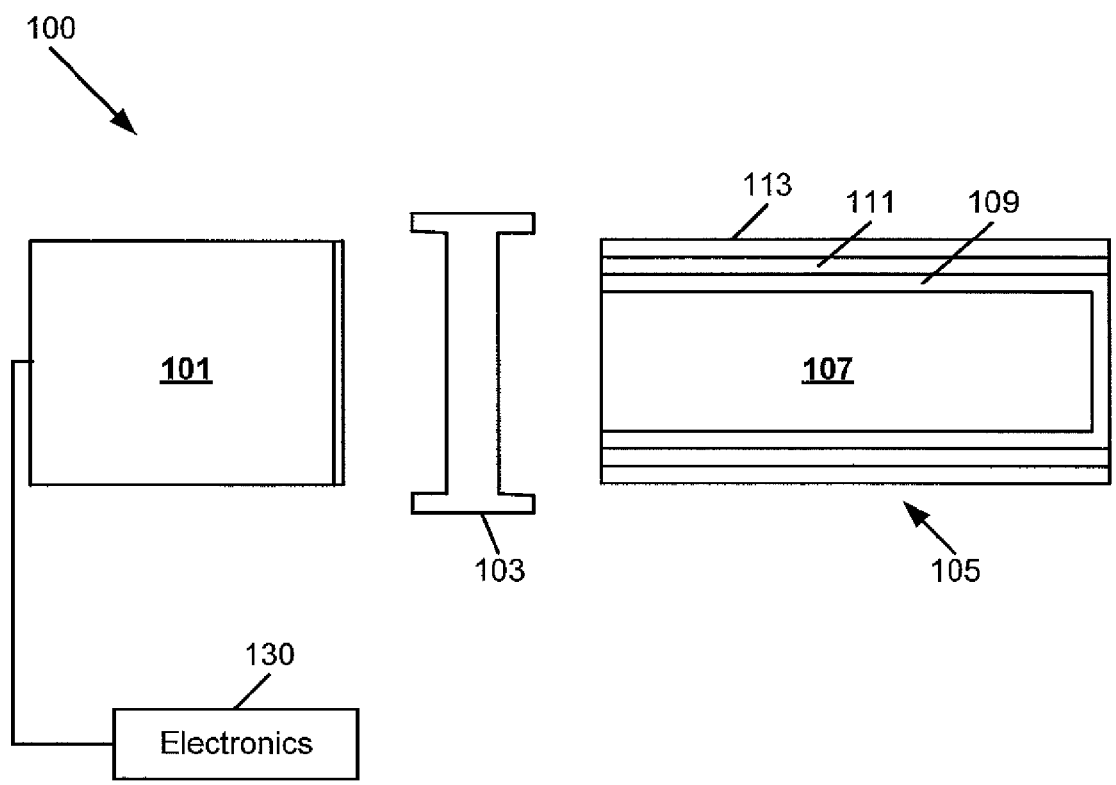
FIG. 1 is an illustration of a particular embodiment of a radiation detector device.

FIG. 1 shows a particular embodiment of a radiation detector device 100. The radiation detector device 100 includes a photosensor 101, a light pipe 103, and a scintillation device 105. Though the photosensor 101, the light pipe 103, and the scintillation device 105 are illustrated separately from each other, it is to be understood that the photosensor 101 and the scintillation device 105 are adapted to be coupled to each other via the light pipe 103.

In one embodiment, the photosensor 101 includes a device capable of spectral detection and resolution. For example, the photosensor 101 can comprise a conventional photomultiplier tube (PMT), a hybrid photodetector, or a photodiode. The photosensor 101 is adapted to receive photons emitted by the scintillation device 105 after absorbing x-rays or other radiation, and the photosensor 101 is adapted to produce electrical pulses or imaging signals from photons that it receives.

The electronics 130 can include one or more electronic devices, such as an amplifier, a pre-amplifier, a discriminator, an analog-to-digital signal converter, a photon counter, another electronic device, or any combination thereof. The photosensor 101 can be housed within a tube or housing made of a material capable of protecting electronics associated with the photosensor 101, such as a metal, metal alloy, other material, or any combination thereof.

As illustrated, the light pipe 103 is disposed between the photosensor 101 and the scintillation device 105 and facilitates optical coupling between the photosensor 101 and the scintillation device 105. In one embodiment, the light pipe 103 can include a quartz light pipe, plastic light pipe, or another light pipe. In another embodiment, the light pipe 103 can comprise a silicone rubber interface that optically couples an output window 119 of the scintillation device 105 with an input window of the photosensor 101. In some embodiments, multiple light pipes can be disposed between the photosensor 101 and the scintillation device 105.

The scintillation device 105 includes a scintillator body 107 housed within a casing 115. The scintillator body 107 can have various shapes, such as a rectangular shape, or a cylindrical surface including flat end faces. It will be appreciated that the surface finish of the scintillator body 107 can be sanded, polished, ground, etc., as desired.

The scintillator body 107 has a length that extends from a first end that is proximal to the photosensor 101 and a second end that is distal from the photosensor 101. The scintillation device 105 also includes a reflector 109 substantially surrounding the scintillator body 107. In addition, the scintillation device 105 can include a boot 111 that acts as a shock absorber to prevent damage to the scintillator body 107. The boot 111 can comprise a polymer, such as silicone rubber, another material, or a combination thereof. Further, the scintillation device 105 can also include a casing 113.

In a particular embodiment, the scintillator body 107 is a ceramic scintillator body that includes a polycrystalline ceramic scintillating material having a substantially cubic crystallographic structure. The polycrystalline ceramic scintillating material has a chemical composition represented by a general formula $Lu_{(2-x)}Gd_xO_3$:Ac. The value of x is greater than 0 and less than 2. For instance, the value of x can be greater than zero and less than or equal to one, such as in the chemical composition represented by the general formula $LuGdO_3$:Ac. Alternatively, the value of x can be greater than 1 and less than 2, such as in the chemical composition represented by the general formula $Lu_{0.5}Gd_{1.5}O_3$:Ac.

As represented in the general formula, the polycrystalline ceramic scintillating material also includes an activator, Ac. The activator causes the scintillator body 107 to emit visible light or ultraviolet light after absorbing gamma radiation, x-rays, ultraviolet radiation, or other radiation. The activator can include a rare earth element, such as a lanthanide element. For example, the activator can include cerium, europium, praseodymium, samarium, terbium, or ytterbium. In an illustrative embodiment, the activator comprises less than or equal to approximately ten percent (10%) of the polycrystalline ceramic scintillating material, such as less than or equal to approximately five percent (5%) or less than or equal to approximately two percent (2%) of the polycrystalline ceramic scintillating material.

In another embodiment, the polycrystalline ceramic scintillating material includes a co-dopant. The co-dopant can include an aliovalent cation. For example, the co-dopant can be a divalent cation, such as calcium. In another example, the co-dopant can be a quatrovalent cation, such as zirconium. In yet another example, the co-dopant can include a rare earth element that is different from the activator, such as cerium, terbium, praseodymium, europium, or any combination thereof. In an illustrative embodiment, the activator and co-dopant can collectively comprise less than or equal to approximately ten percent (10%) of the polycrystalline ceramic scintillating material, such as less than or equal to approximately five percent (5%) or less than or equal to approximately two percent (2%) of the polycrystalline ceramic scintillating material. For instance, the co-dopant can comprise less than or equal to approximately five percent (5%) of the polycrystalline ceramic scintillating material.

In an illustrative embodiment, the polycrystalline ceramic scintillating material can be characterized by a grain size of from approximately 1 μm to approximately 100 μm. Additionally, the scintillator body 107 can also be characterized by a density of greater than 98%, such as greater than or equal to 99.9%, of theoretical density. In addition, the scintillator body 107 can be characterized by an optical transmittance of greater than fifty percent (50%) total transmission at a scintillator body thickness that stops greater than 98% of x-ray or other radiation at a wavelength of maximum emission. In addition, the scintillator body 107 can be characterized by a decay time of less than 1 ms. The scintillator body 107 can also be characterized by a high stopping power, such as with an atomic number (eff Z) of greater than approximately 62.

Figure 2:
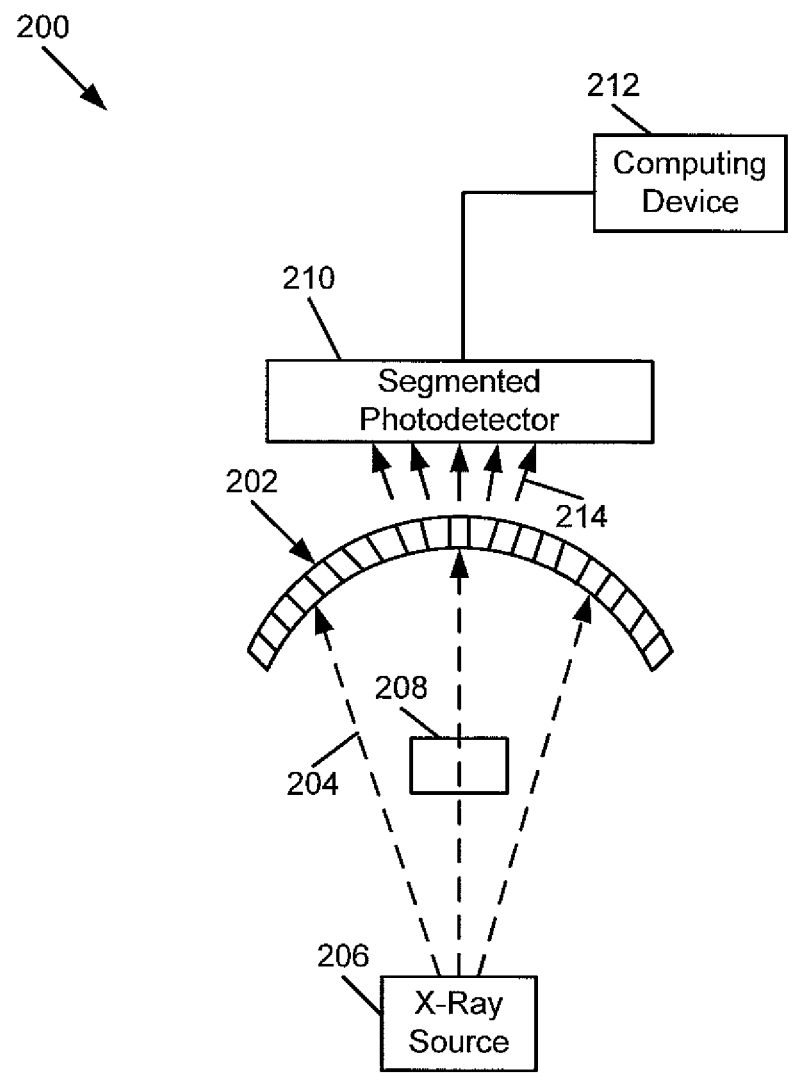
FIG. 2 is an illustration of a particular embodiment of x-ray scanning equipment.

FIG. 2 illustrates a particular embodiment of x-ray scanning equipment 200, such as x-ray computed tomography (CT) equipment. The x-ray scanning equipment 200 includes an array 202 of scintillator devices, or pixels, and a segmented photodetector 210. The x-ray scanning equipment 200 also includes an x-ray source 206 adapted to emit x-rays 204, e.g., in a fan-shaped or cone-shaped pattern. The x-ray source 206 and the array 202 of scintillator devices may be adapted to rotate about an object 208. For example, the x-ray source 206 and the array 202 may be adapted to rotate opposite each other substantially along a circle centered about the object 208 and at substantially equal rates.

In a particular embodiment, each pixel in the array 202 includes a ceramic scintillator body. Each ceramic scintillator body is adapted to absorb x-rays 204 emitted by the x-ray source 206 and to emit scintillation light 214 that feeds into the segmented photodetector 210. The segmented photodetector 210 is adapted to measure scintillation light 214 received from each pixel and to determine from which pixel the particular scintillation light is received. The segmented photodetector 210 is adapted to produce signals based on the amount of scintillation light emitted by each pixel in the array 202 from various angles and to send the signals to the computing device 212. The computing device 212 is adapted to construct an image of the object 208 based on the signals received from the segmented photodetector 210.

Each ceramic scintillator body comprises a polycrystalline ceramic scintillating material having a substantially cubic crystallographic structure. The polycrystalline ceramic scintillating material has a chemical composition represented by a general formula $Lu_{(2-x)}Gd_xO_3$:Ac, where Ac is an activator. The value of x is greater than 0 and less than 2. For instance, the value of x can be greater than zero and less than or equal to one, such as in the chemical composition represented by the general formula $LuGdO_3$:Ac. Alternatively, the value of x can be greater than 1 and less than 2, such as in the chemical composition represented by the general formula $Lu_{0.5}Gd_{1.5}O_3$:Ac.

The activator, Ac, can include a rare earth element, such as a lanthanide element. For example, the activator can include cerium, europium, praseodymium, samarium, terbium, or ytterbium. In an illustrative embodiment, the activator comprises less than or equal to approximately ten percent (10%) of the polycrystalline ceramic scintillating material based on molar percentage, such as less than or equal to approximately five percent (5%) or less than or equal to approximately two percent (2%) of the polycrystalline ceramic scintillating material based on molar percentage.

In another embodiment, the polycrystalline ceramic scintillating material can include a co-dopant, such as an aliovalent cation. In one example, the co-dopant can be a divalent cation, such as calcium. In another example, the co-dopant can be a quatrovalent cation, such as zirconium. In yet another example, the co-dopant can include a rare earth element that is different from the activator, such as cerium, terbium, praseodymium, europium, or any combination thereof. In an illustrative embodiment, the activator and co-dopant can collectively comprise less than or equal to approximately ten percent (10%) of the polycrystalline ceramic scintillating material based on molar percentage, such as less than or equal to approximately five percent (5%) or less than or equal to approximately two percent (2%) of the polycrystalline ceramic scintillating material based on molar percentage. For instance, the co-dopant can comprise less than or equal to approximately five percent (5%) of the polycrystalline ceramic scintillating material based on molar percentage.

In an illustrative embodiment, the polycrystalline scintillating material can be characterized by a grain size of from approximately 1 µm to approximately 100 µm. Additionally, each ceramic scintillator body can also be characterized by a density of greater than 98%, such as greater than or equal to 99.9%, of theoretical density. Further, each ceramic scintillator body can be characterized by an optical transmittance of greater than fifty percent (50%) total transmission at a scintillator body thickness that stops greater than 98% of x-ray or other radiation at a wavelength of maximum emission. In addition, each ceramic scintillator body can be characterized by a decay time of less than 1 ms. Each ceramic scintillator body can also be characterized by a high stopping power, such as with an atomic number (eff Z) of greater than approximately 62.

Figure 3:
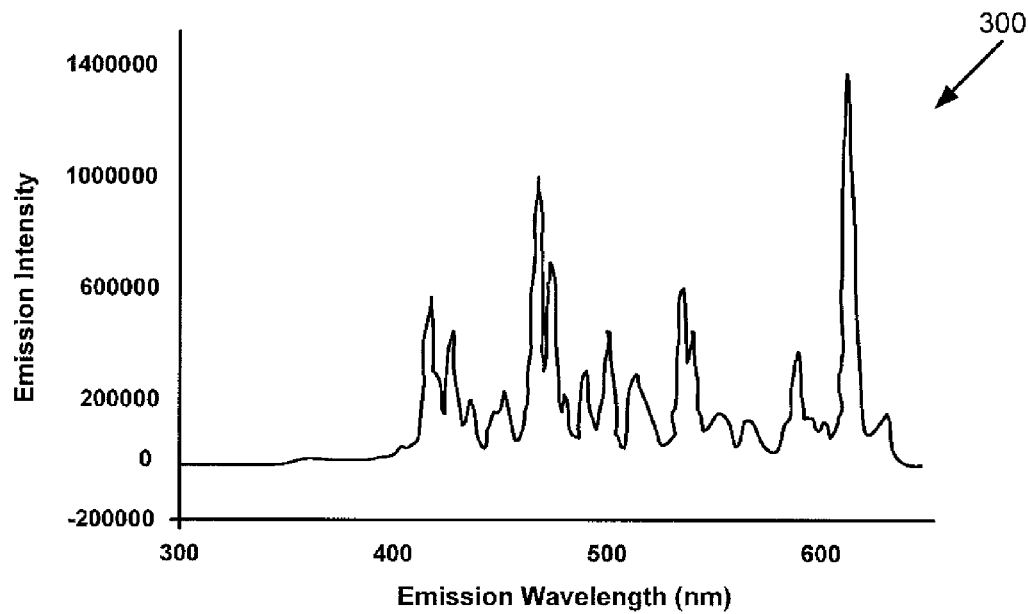
FIG. 3 is a graph illustrating emission intensity in lutetium gadolinium oxide scintillating material.
Figure 4:
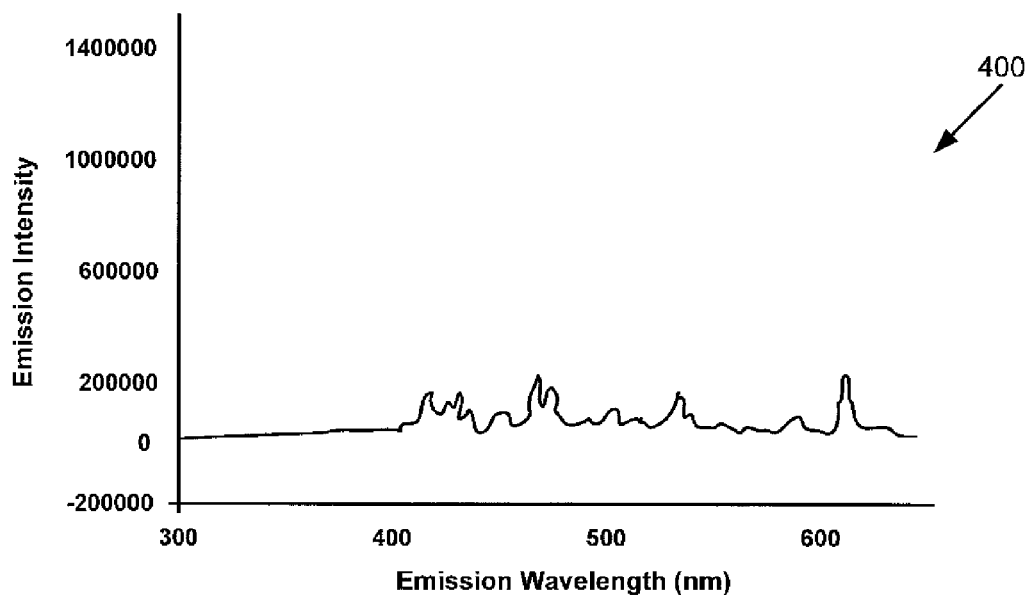
FIG. 4 is a graph illustrating emission intensity in lutetium oxide scintillating material.

FIG. 3 is a graph 300 illustrating emission intensity versus emission wavelength with respect to a lutetium gadolinium oxide ($LuGdO_3$) scintillating material. The polycrystalline ceramic scintillating material includes europium as an activator in a proportion of two percent (2%). The graph 300 shows emission intensity at various wavelengths using an excitation wavelength of 266 nm with a gate delay of 10 ns and a gate width of 50 ns. FIG. 4 is a graph 400 illustrating emission intensity versus emission wavelength with respect to a lutetium oxide ($Lu_2O_3$) scintillating material also doped with europium as an activator in a proportion of two percent (2%). The graph 400 also shows emission intensity at various wavelengths using an excitation wavelength of 266 nm with a gate delay of 10 ns and a gate width of 50 ns.

The graph 300 illustrates that $LuGdO_3$ is characterized by significantly greater emission intensity than that of $Lu_2O_3$, shown in FIG. 3. For example, $LuGdO_3$ exhibits an average emission intensity of greater than or equal to 40,000 ph/MeV at emission wavelengths of from approximately 410 nm to approximately 620 nm, with a maximum emission peak at 610 nm. Whereas, as illustrated in FIG. 4, scintillating material including $Lu_2O_3$ exhibits an average emission intensity of less than approximately 30,000 ph/MeV at emission wavelengths of from approximately 410 nm to approximately 620 nm.

Figure 5:
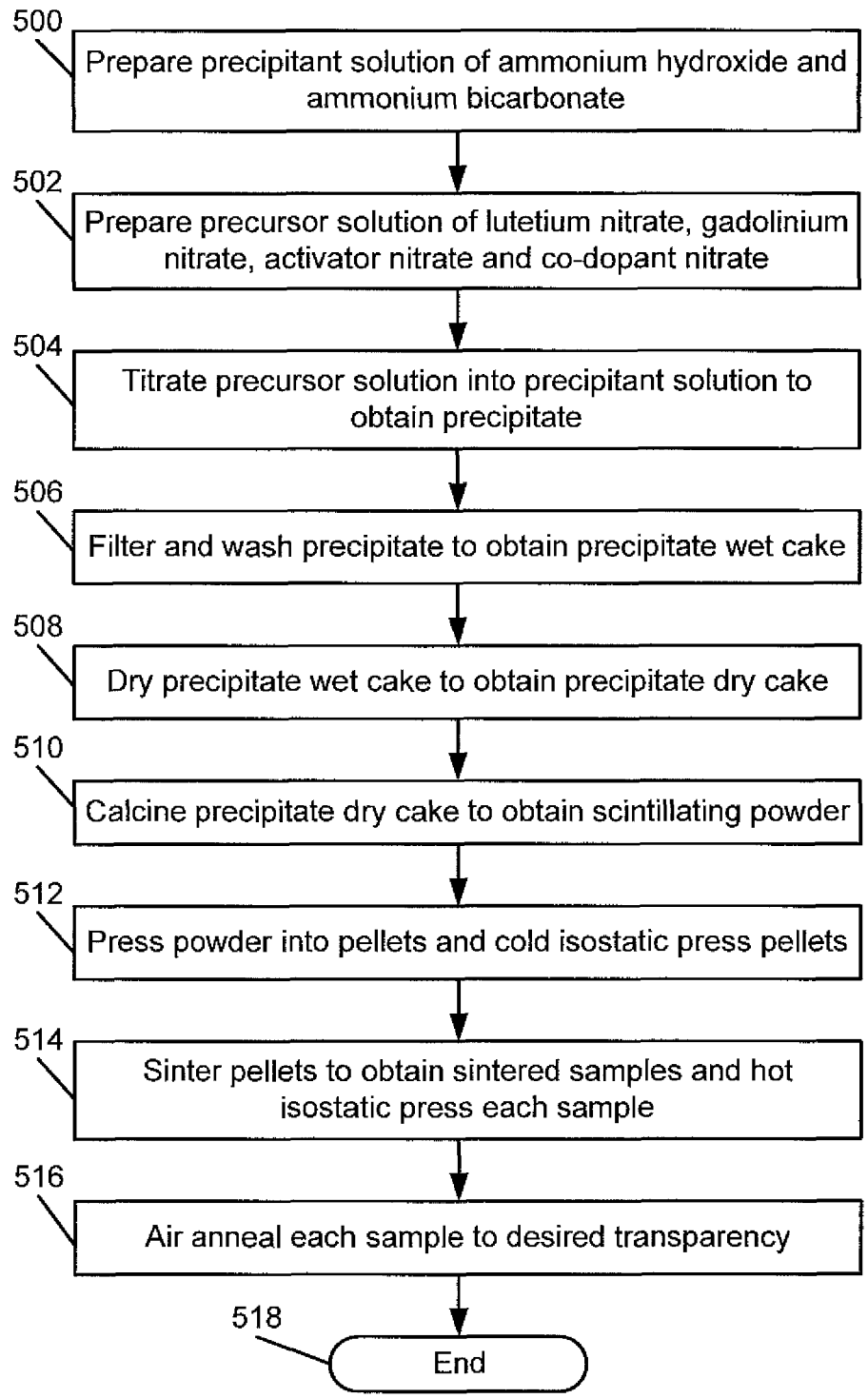
FIG. 5 is a flow diagram illustrating a method of producing a ceramic scintillator body.

FIG. 5 illustrates a method of producing a ceramic scintillator body. At block 500, a precipitant solution of ammonium hydroxide and ammonium bicarbonate is prepared. Moving to block 502, a precursor solution of lutetium nitrate, gadolinium nitrate, an activator (Ac) nitrate precursor, and a co-dopant nitrate precursor, is prepared. Proceeding to block 504, the precursor solution is titrated into the precipitant solution to form a precipitate. Continuing to block 506, the precipitate is filtered and washed, and a precipitate wet cake is obtained. For example, the precipitate can be washed using deionized water until a desired conductivity value of residual ions is reached. In another example, the precipitate can also be washed with ethanol to prevent agglomeration during drying.

Advancing to block 508, the precipitate wet cake is dried to obtain a precipitate dry cake. At block 510, the precipitate dry cake is calcined to obtain a polycrystalline ceramic scintillating powder having a composition represented by the general formula $Lu_{(2-x)}Gd_xO_3$:Ac (where x is less than two and greater than zero) and including a co-dopant. Moving to block 512, the calcined powder can be formed into ceramic scintillator bodies by first die pressing the powder into pellets and then cold isostatic pressing the pellets. Proceeding to block 514, the pressed pellets are sintered to obtain sintered samples, and each sample is hot isostatic pressed. Advancing to block 516, in a particular embodiment, each sample is air annealed to improve transparency. The method terminates at 518.

EXAMPLE

In one example, a precipitant solution of ammonium hydroxide (NH4OH) and ammonium bicarbonate (NH4HCO3) was prepared by adding 3M NH4OH and 1M NH4HCO3 to a beaker and mixing to form a uniform complex precipitant solution, diluted to approximately 500 ml. Next, a solution of precursors was prepared by mixing 60 ml $Lu(NO_3)_3$ (0.87M), 42.44 ml $Gd(NO_3)_3$ (1.23M), 16.04 ml $Eu(NO_3)_3$ (0.49M), 9.56 µl $Pr(NO_3)_3$ (1.13M), diluted to 1.5 . The precursor solution was titrated into the precipitant solution to form a precipitate. The precipitate was filtered from solution and washed with deionized water and Ethanol to produce a precipitate wet cake.

The precipitate wet cake was dried in an oven at approximately 60° C., and the dried cake was calcined at 850° C. for 2 hrs in order to form a scintillating material having a composition of $LuGdO_3$ with 7% Eu and 100 ppm $Pr^{3+}$. The amount of co-dopant precursor used in the above example can be altered to vary the amount of co-dopant in the composition of the scintillating material, as shown in TABLE 1, below.

TABLE 1

| DESIRED CO-DOPANT AMOUNT | PRE-CURSOR AMOUNT |
|---|---|
| 1000 ppm Pr | 95.6 µl $Pr(NO_3)_3$ (1.13M) |
| 100 ppm Tb | 17.4 µl $Tb(NO_3)_3$ (0.62M) |
| 100 ppm Ce | 20.54 µl $Ce(NO_3)_3$ (0.526M) |
| 100 ppm Ca | 20.6 µl $Ca(NO_3)_2$ (0.524M) |

The calcined powder was formed into ceramic scintillator bodies, by die pressing the powder into approximately 12 mm diameter pellets and then cold isostatic pressing the pellets to 30 ksi ($2.07 \times 10^8$ Pa). The pressed pellets were then sintered in air at 1550° C. for 3 hrs. Each sintered sample was then hot isostatic pressed at 1500° C. for 1 hr in Argon at 30 ksi to produce a ceramic scintillator body.

It is found that characteristics of the powder scintillating material can affect density and transparency of the resulting scintillator body. Some prior methods aim to produce powders having a uniform distribution of extremely small particles one the order of 1-5 nm in diameter, while other prior methods mix large (e.g., greater than 500 nm) and small (1-5 nm) sizes to attempt to fill any gaps between particles. However, it is found that a powder having substantially spherical particles between 10 nm and 500 nm, with a narrow particle size distribution is advantageous. For instance, a powder scintillating material having substantially spherical particles, where at least ninety percent of the particles have a size between approximately 50 nm and approximately 250 nm, such as approximately 66 nm to approximately 220 nm, can be used to produce a scintillator body having increased density and transparency.

In accordance with the embodiments described herein, a ceramic scintillator body is disclosed that includes a polycrystalline ceramic scintillating material having a cubic crystallographic structure and having a chemical composition represented by a general formula $Lu_{(2-x)}Gd_xO_3$:Ac, where x is greater than zero and less than two and where Ac is an activator. While some rare earth oxides, such as lutetium oxide, can make effective scintillating materials, the cost of lutetium can produce a barrier to commercialization of lutetium oxide scintillators. It is found that the addition of gadolinium can significantly reduce the cost of scintillating material, while maintaining a substantially cubic crystallographic structure and causing only slight reductions in radiation stopping power when compared with lutetium oxide. In addition, it is found that lutetium gadolinium oxide doped with a rare earth activator such as europium exhibits a significantly higher emission intensity over emission wavelengths from approximately 410 nm to 620 nm, as illustrated in FIGS. 3 and 4.

In a particular embodiment, the polycrystalline ceramic scintillating material includes a co-dopant. While some rare earth activators, such as europium, can contribute to high scintillator efficiency, they may also produce a long afterglow in medical imaging applications as scintillation light lingers after a radiation source is deactivated. Afterglow is often caused by electron traps in scintillating material and can be reduced by adding certain elements. It is found that two approaches can reduce afterglow due to electron traps in lutetium gadolinium oxide. In one embodiment, electron traps caused by oxygen-related defects (e.g., oxygen vacancies or interstitial oxygen ions) in lutetium gadolinium oxide can be reduced by introducing aliovalent ions. It is found that calcium and zirconium are effective due to the closeness of their ionic radii to the ionic radii of lutetium and gadolinium.

In another embodiment, it is found that afterglow can be reduced by introducing more favorable electron traps that do not contribute to afterglow by later releasing trapped electrons. For instance, the addition of rare earth co-dopants, such as praseodymium, cerium or terbium can create favorable electron traps that do not release trapped electrons or that cause non-radiative decay of trapped electrons.

Hence, the scintillator efficiency of activators, such as europium, can be realized while afterglow is reduced. For example, a scintillator body produced from $Lu_{(2-x)}Gd_xO_3$:Eu (where x is greater than zero and less than two) and containing a co-dopant of calcium, cerium, praseodymium, terbium or zirconium, can be characterized by an afterglow of less than or equal to approximately 0.01% at 100 ms. TABLE 2, below, includes illustrative examples of scintillating material compositions having approximately 7% percent of europium based on molar percentage, and a co-dopant listed in ppm.

TABLE 2

| SAMPLE |
| --- |
| $(Lu,Gd)_2O_3$:Eu, 100 ppm Pr |
| $(Lu,Gd)_2O_3$:Eu, 1000 ppm Pr |
| $(Lu,Gd)_2O_3$:Eu, 100 ppm Tb |
| $(Lu,Gd)_2O_3$:Eu, 1000 ppm Tb |
| $(Lu,Gd)_2O_3$:Eu, 10000 ppm Tb |
| $(Lu,Gd)_2O_3$:Eu, 100 ppm Ce |
| $(Lu,Gd)_2O_3$:Eu, 1000 ppm Ce |
| $(Lu,Gd)_2O_3$:Eu, 100 ppm Ca |
| $(Lu,Gd)_2O_3$:Eu, 1000 ppm Ca |
| $(Lu,Gd)_2O_3$:Eu, 1000 ppm Zr |

The illustrations of the embodiments described herein are intended to provide a general understanding of the structure of the various embodiments. The illustrations are not intended to serve as a complete description of all of the elements and features of the compositions, apparatuses, systems, or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the Figures are to be regarded as illustrative rather than restrictive.

According to a first aspect, a ceramic scintillator body includes a polycrystalline ceramic scintillating material having a substantially cubic crystallographic structure. The polycrystalline ceramic scintillating material has a chemical composition represented by a general formula $Lu_{(2-x)}Gd_xO_3$:Ac, where x is greater than zero and less than two, and Ac is an activator. The activator can comprise a rare earth element, such as a lanthanide element. For example, the activator can include cerium, europium, praseodymium, samarium, terbium, or ytterbium. In an illustrative embodiment, the activator can comprise less than or equal to ten percent (10%) of the polycrystalline ceramic scintillating material based on molar percentage, such as less than or equal to five percent (5%) of the polycrystalline ceramic scintillating material based on molar percentage or less than or equal to two percent (2%) of the polycrystalline ceramic scintillating material based on molar percentage.

In another embodiment of the first aspect, the polycrystalline ceramic scintillating material can include a co-dopant. The co-dopant can include an aliovalent cation, such as a divalent cation or a quatrovalent cation. For example, the co-dopant can comprise calcium or zirconium. Alternatively, the co-dopant can include a rare earth element that is different from the activator, such as at least one of cerium, terbium, or praseodymium. In an illustrative example, europium can be used as an activator.

The activator and co-dopant can collectively comprise less than or equal to ten percent (10%) of the polycrystalline ceramic scintillating material based on molar percentage, such as less than or equal to five percent (5%) of the polycrystalline ceramic scintillating material based on molar percentage or less than or equal to two percent (2%) of the polycrystalline ceramic scintillating material based on molar percentage.

In a second aspect, a scintillation device includes a ceramic scintillator body that comprises a polycrystalline ceramic scintillating material having a substantially cubic crystallographic structure. The polycrystalline ceramic scintillating material has a chemical composition represented by a general formula $Lu_{(2-x)}Gd_xO_3$:Ac, where x is greater than zero and less than two, and where Ac is an activator. In one embodiment of the second aspect, x can be greater than zero and less than or equal to 1. In another embodiment, x can be greater than 1 and less than 2.

In an embodiment of the second aspect, the ceramic scintillator body is characterized by an afterglow of less than or equal to approximately 0.01% at 100 ms. In another embodiment of the second aspect, the ceramic scintillator body is characterized by an average emission intensity of greater than or equal to 40,000 ph/MeV at emission wavelengths of from approximately 410 nm to approximately 620 nm. In a further embodiment of the second aspect, the ceramic scintillator body can be characterized by a main emission peak of 610 nm In yet another embodiment of the second aspect, the ceramic scintillator body is characterized by a grain size of from approximately 1 micron to approximately 100 microns. In still another embodiment of the second aspect, the ceramic scintillator body is characterized by a density of greater than or equal to 99.9% of theoretical density In another embodiment of the second aspect, the ceramic scintillator body is characterized by an optical transmittance of greater than 50% total transmission at a scintillator body thickness that stops greater than 98% of x-ray or other radiation at a wavelength of maximum emission. In an additional embodiment of the second aspect, the ceramic scintillator body is characterized by a decay time of less than or equal to approximately 1 ms.

According to a third aspect, a ceramic scintillating powder includes a polycrystalline ceramic scintillating material having a substantially cubic crystallographic structure. The polycrystalline ceramic scintillating material has a chemical composition represented by a general formula $Lu_{(2-x)}Gd_xO_3$:Ac, where x is greater than zero and less than two, and where Ac is an activator.

In one embodiment of the third aspect, the polycrystalline ceramic scintillating material comprises a plurality of substantially spherical particles and wherein at least ninety percent of the particles are characterized by a particle size of from approximately 50 nm to approximately 250 nm. For example, at least ninety percent of the particles can be characterized by a particle size of from approximately 66 nm to approximately 220 nm.

In the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A scintillation device comprising a ceramic scintillator body that includes a polycrystalline ceramic scintillating material having a substantially cubic crystallographic structure, the polycrystalline ceramic scintillating material having a chemical composition represented by a general formula $Lu_{(2-x)}Gd_xO_3$:Ac, Me, wherein:
   x is greater than zero and less than two,
   Ac is an activator including cerium or samarium, and
   Me is a co-dopant that is different from the activator and includes calcium, zirconium, cerium terbium, or praseodymium.

2. The scintillation device of claim 1, wherein the activator is cerium.

3. The scintillation device of claim 1, wherein the activator is samarium.

4. The scintillation device of claim 1, wherein the activator comprises less than or equal to ten percent (10%) of the polycrystalline ceramic scintillating material based on molar percentage.

5. The scintillation device of claim 1, wherein the co-dopant comprises calcium.

6. The scintillation device of claim 1, wherein the co-dopant comprises zirconium.

7. The scintillation device of claim 1, wherein the co-dopant comprises at least one of cerium, terbium, or praseodymium.

8. The scintillation device, of claim 1, wherein the activator and co-dopant collectively comprise less than or equal to ten percent (10%) of the polycrystalline ceramic scintillating material based on molar percentage.

9. The scintillation device of claim 1, wherein x is greater than zero and less than or equal to 1.

10. The scintillation device of claim 1, wherein x is greater than 1 and less than 2.

11. The scintillation device of claim 1, wherein the ceramic scintillator body is characterized by an afterglow of less than or equal to approximately 0.01 % at 100 ms.

12. The scintillation device of claim 1, wherein the ceramic scintillator body is characterized by an average emission intensity of greater than or equal to 40,000 ph/MeV at emission wavelengths of from approximately 410 nm to approximately 620 nm.

13. The scintillation device of claim 1, wherein the ceramic scintillator body is characterized by a maximum emission peak of approximately 610 nm.

14. The scintillation device of claim 1, wherein the polycrystalline ceramic scintillating material is characterized by a grain size of from approximately 1 µm to approximately 100 µm.

15. The scintillation device of claim 1, wherein the ceramic scintillator body is characterized by a density of greater than or equal to 99.9% of theoretical density.

16. The scintillation device of claim 1, wherein the ceramic scintillator body is characterized by an optical transmittance of greater than fifty percent (50%) total transmission at a scintillator body thickness that stops greater than 98% of x-ray radiation at a wavelength of maximum emission.

17. The scintillation device of claim 1, wherein the ceramic scintillator body is characterized by a decay time of less than or equal to 1 ms.

18. A scintillation device comprising a ceramic scintillator body that includes a polycrystalline ceramic scintillating material having a substantially cubic crystallographic structure, the polycrystalline ceramic scintillating material having a chemical composition represented by a general formula $Lu_{(2-x)}Gd_xO_3$:Ac,Me, wherein:
   x is greater than zero and less than two,
   Ac is an activator comprising a rare earth element, and
   Me is a co-dopant including cerium, wherein the activator is different from the co-dopant.

19. The scintillator device of claim 18, wherein the activator comprises europium, praseodymium, samarium, terbium, or ytterbium.

20. The scintillator device of claim 19, wherein the ceramic scintillator body is characterized by an afterglow of less than or equal to approximately 0.01% at 100 ms.

* * * * *